United States Patent
Wang et al.

(10) Patent No.: US 9,842,685 B2
(45) Date of Patent: Dec. 12, 2017

(54) ARTIFICIAL MAGNETIC STRUCTURES FOR WIRELESS POWER TRANSFER

(71) Applicant: Mitsubishi Electric Research Laboratories, Inc., Cambridge, MA (US)

(72) Inventors: Bingnan Wang, Belmont, MA (US); William S. Yerazunis, Acton, MA (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 661 days.

(21) Appl. No.: 14/336,406

(22) Filed: Jul. 21, 2014

(65) Prior Publication Data
US 2016/0020018 A1 Jan. 21, 2016

(51) Int. Cl.
*H02J 17/00* (2006.01)
*H01F 38/14* (2006.01)
*H02J 50/12* (2016.01)
*H04B 5/00* (2006.01)
*H01Q 7/00* (2006.01)
*H01Q 15/00* (2006.01)

(52) U.S. Cl.
CPC ........... *H01F 38/14* (2013.01); *H01Q 7/00* (2013.01); *H01Q 15/0053* (2013.01); *H02J 50/12* (2016.02); *H04B 5/0037* (2013.01); *H01Q 15/0086* (2013.01)

(58) Field of Classification Search
CPC .......................... H02J 50/12; H01Q 15/0086
See application file for complete search history.

(56) References Cited

U.S. PATENT DOCUMENTS

| | | | |
|---|---|---|---|
| 2002/0167457 A1 | 11/2002 | McKinzie et al. | |
| 2003/0071763 A1 | 4/2003 | McKinzie et al. | |
| 2007/0222542 A1 | 9/2007 | Joannopoulos et al. | |
| 2008/0278264 A1 | 11/2008 | Karalis et al. | |
| 2011/0140543 A1* | 6/2011 | Ryu | H02J 17/00 307/104 |
| 2012/0280575 A1* | 11/2012 | Kim | H02J 17/00 307/104 |
| 2013/0058380 A1* | 3/2013 | Kim | B60L 11/1838 375/146 |

FOREIGN PATENT DOCUMENTS

| | | |
|---|---|---|
| ES | 2342816 A1 | 7/2010 |
| WO | 2004093244 A2 | 10/2004 |

* cited by examiner

*Primary Examiner* — Daniel Cavallari
(74) *Attorney, Agent, or Firm* — Gene Vinokur; James McAleenan; Hironori Tsukamoto

(57) ABSTRACT

A system includes a first resonator coupled to an energy source and a second resonator located a distance from the first resonator and coupled to the first resonator to provide near-field wireless energy transfer between the first resonator and the second resonator. The first resonator and the second resonator are non-radiative structures having a resonant frequency. The system also includes an artificial magnetic conductor (AMC) having the resonant frequency and arranged within the system to shape the near-field of at least one of the first resonator and the second resonator. The AMC includes a layer of unit cells arranged in a periodic pattern enabling the AMC to reflect the near-field. Each unit cell of the AMC includes a plurality of electronic components.

16 Claims, 17 Drawing Sheets

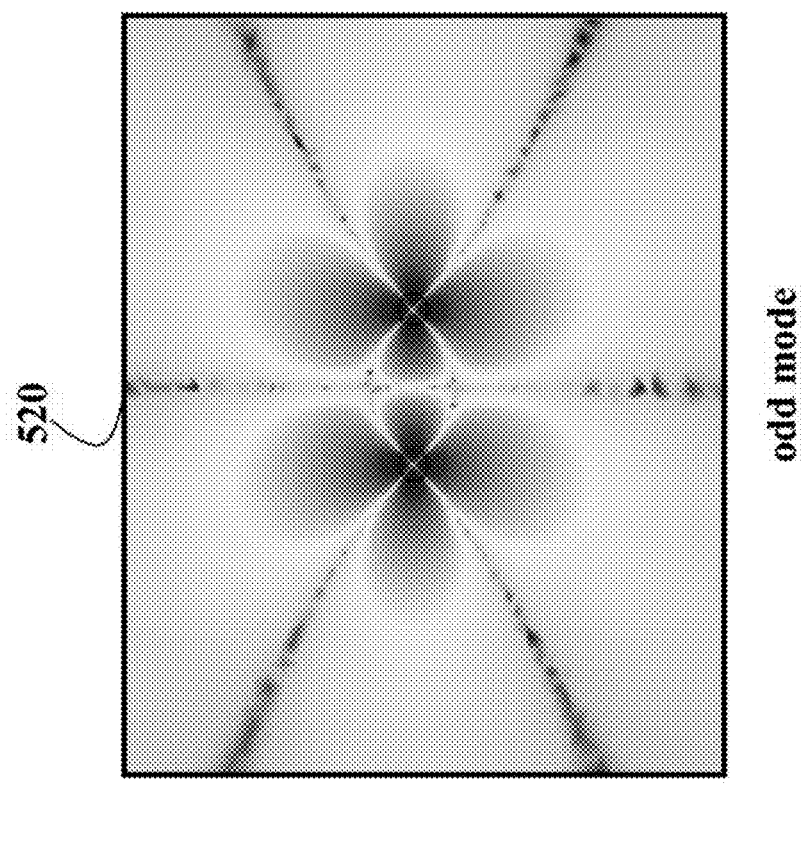
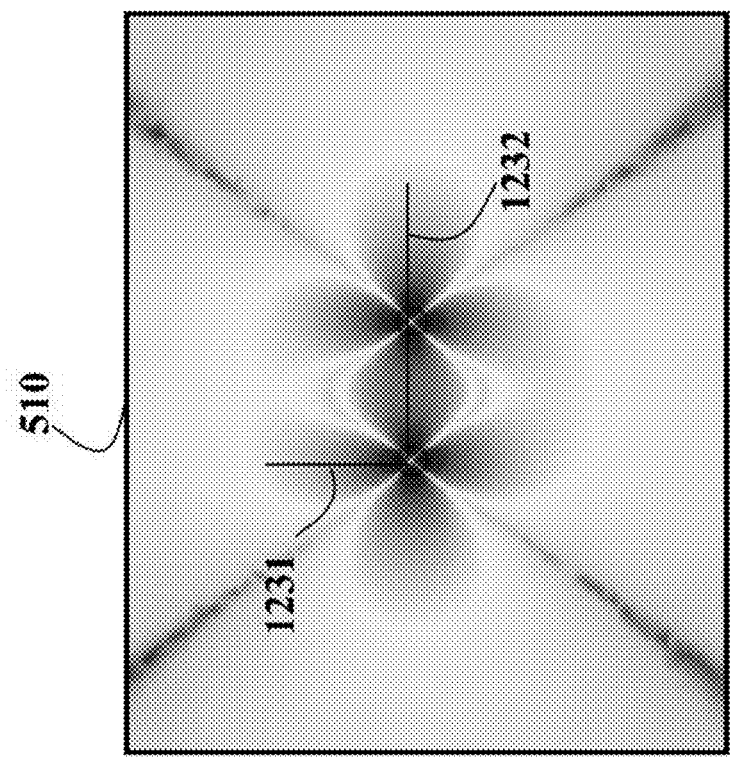
FIG. 5
500

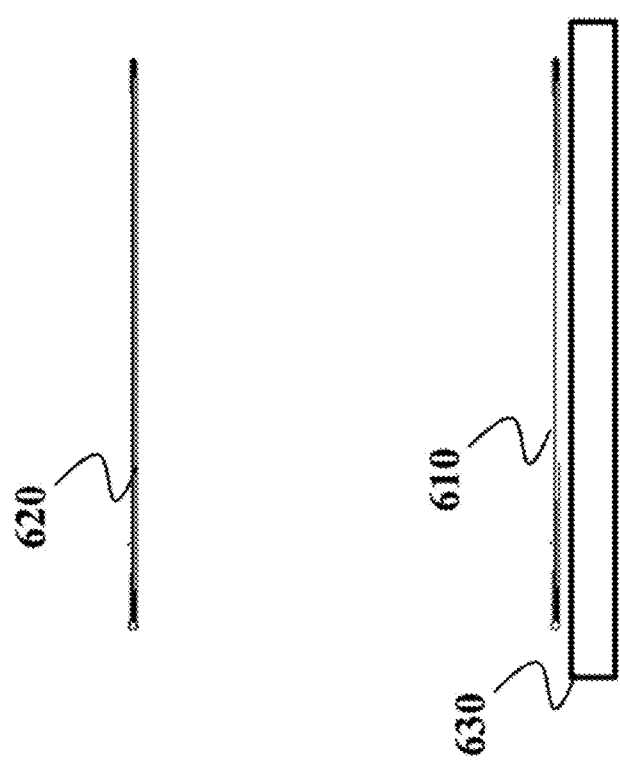
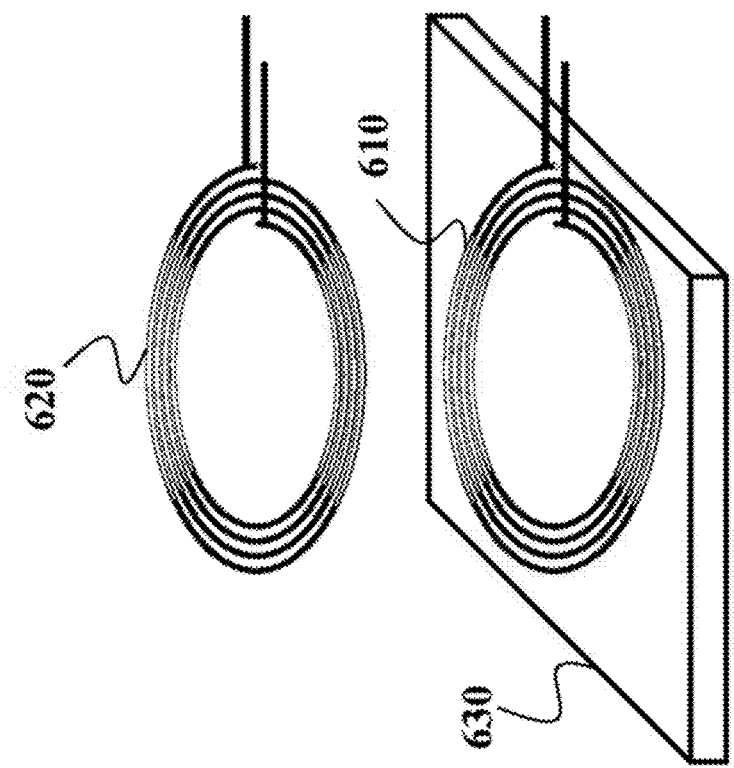
FIG. 6A
FIG. 6B

ARTIFICIAL MAGNETIC STRUCTURES FOR WIRELESS POWER TRANSFER

FIELD OF THE INVENTION

The present invention relates to transferring energy, and more particularly, to transferring energy wirelessly.

BACKGROUND OF THE INVENTION

Inductive coupling is used in a number of wireless energy transfer applications such as charging a cordless electronic toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

In resonant coupling, two resonant electromagnetic objects, i.e., the source and the sink, interact with each other under resonance conditions. The resonant coupling transfers energy from the source to the sink over a mid-range distance, e.g., a fraction of the resonant frequency wavelength. Examples of the resonant coupling system are described in U.S. Patent Applications 2008/0278264 and 2007/0222542.

According to coupled-mode theory, strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, two resonant frequencies can be observed, named even and odd mode frequencies, due to the coupling effect. The coupling coefficient of two objects resonant system formed by two exactly same resonant structures is calculated by partitioning of the even and odd modes according to $$\kappa = \pi |f_{even} - f_{odd}|. \quad (1)$$

It is a challenge to enhance the coupling. For example, to optimize the coupling, resonant objects with a high quality factor Q, which is a ratio of inductive reactance to resistance at a given frequency, are selected. Accordingly, it is desired to optimize wireless energy transfer between the source and the sink.

SUMMARY OF THE INVENTION

Some embodiments of the invention are based on a realization that a coupling of evanescent waves between two resonators of the resonant frequency can be optimized by arranging strategically an artificial magnetic conductor (AMC) having the resonant frequency in a neighborhood of the first or the second resonators to shape the near-field of at least one of the first resonator and the second resonator. For example, the AMC can be arranged within a distance less than ½ of a wavelength of the resonant frequency from the first resonator or the second resonator on a direction opposite to a direction of the energy transfer to increase a coupling coefficient of the energy transfer.

The typical AMC includes a number of metallic patches, i.e., unit cells, arranged into a periodic pattern. The structure of such AMC is suitable for use in the far-field antennas, but creates the resonant frequency unsuitable for wireless energy transfer. To decrease the resonant frequency of such an AMC till the resonant frequency of wireless energy transfer ranging from 20 kHz to 1 MHz, the size of such AMC is too large to be practical.

Various embodiments of the invention are based on a realization that each unit cell does not have to include the rectangular patch, or at least only a rectangular patch to form the AMC. Different structures of the unit cells can be used in the periodic pattern of AMC, and thus those structures can be selected in consideration of desired resonant frequency. Accordingly, in various embodiments of the invention, the AMC includes a layer of unit cells arranged in a periodic pattern enabling the AMC to reflect the near-field, wherein each unit cell includes a plurality of electronic components. For example, the unit cell can include a rectangular patch and a capacitor, or a rectangular patch and multiple capacitors or a capacitor and an inductor. In some embodiments, each unit cell includes at least one or combination of a multi-turn spiral and a plurality of capacitors.

Some embodiments of the invention determine the size and the structure of each unit cell based on a structure of the resonators transferring the energy. For example, one embodiment determines the size of each unit cell and a number of the unit cells, such that the layer of the AMC has a size corresponding to a size of a coil of the resonator. The embodiment determines one or combination of a shape, a capacitance and an inductance of each electric component in each unit cells, such that the resonant frequency of the AMC matches the resonant frequency of the first resonator.

Accordingly, one embodiment discloses a system including a first resonator coupled to an energy source; a second resonator located a distance from the first resonator and coupled to the first resonator to provide near-field wireless energy transfer between the first resonator and the second resonator, wherein the first resonator and the second resonator are non-radiative structures having a resonant frequency; and an artificial magnetic conductor (AMC) having the resonant frequency and arranged within the system to shape the near-field of at least one of the first resonator and the second resonator, wherein the AMC includes a layer of unit cells arranged in a periodic pattern enabling the AMC to reflect the near-field, wherein each unit cell includes a plurality of electronic components.

Another embodiment discloses a method for wireless transfer of energy. The method includes providing a first resonator for coupling to a second resonator to provide near-field wireless energy transfer between the first resonator and the second resonator, wherein the first resonator and the second resonator are non-radiative structures having a resonant frequency within a range from 20 kHz to 1 MHz; and arranging an artificial magnetic conductor (AMC) having the resonant frequency within a distance less than ½ of a wavelength of the resonant frequency from the first resonator on a direction opposite to a direction of the energy transfer to shape the near-field of the first resonator, wherein the AMC includes a layer of unit cells arranged in a periodic pattern enabling the AMC to reflect the near-field, wherein each unit cell includes a plurality of electronic components.

Yet another embodiment discloses an artificial magnetic conductor (AMC) for wireless energy transfer via coupling between a first resonator and a second resonator to provide near-field wireless energy transfer between the first resonator and the second resonator having a resonant frequency within a range from 20 kHz to 1 MHz. The AMC includes a conductive ground plane; a substrate disposed at the ground plane; and a layer of unit cells arranged on the substrate in a periodic pattern enabling the AMC to reflect the near-field for the energy transfer, wherein each unit cell includes a plurality of electronic components, wherein and an inductance and a capacitance of each component of each unit cell are selected to produce the AMC with the resonant frequency.

BRIEF DESCRIPTION OF THE DRAWINGS

FIG. 5 is an example of a crossing pair energy distribution pattern;

FIGS. 6A and 6B show different views of arranging the AMC according to some embodiments of the invention;

DETAILED DESCRIPTION OF THE PREFERRED EMBODIMENTS

Some embodiments of the invention are based on a realization that a coupling of evanescent waves between two resonators of the resonant frequency can be optimized by arranging strategically an artificial magnetic conductor (AMC) having a resonant frequency in a neighborhood of the first or the second resonators to shape the near-field of at least one of the first resonator and the second resonator.

Figure 1:
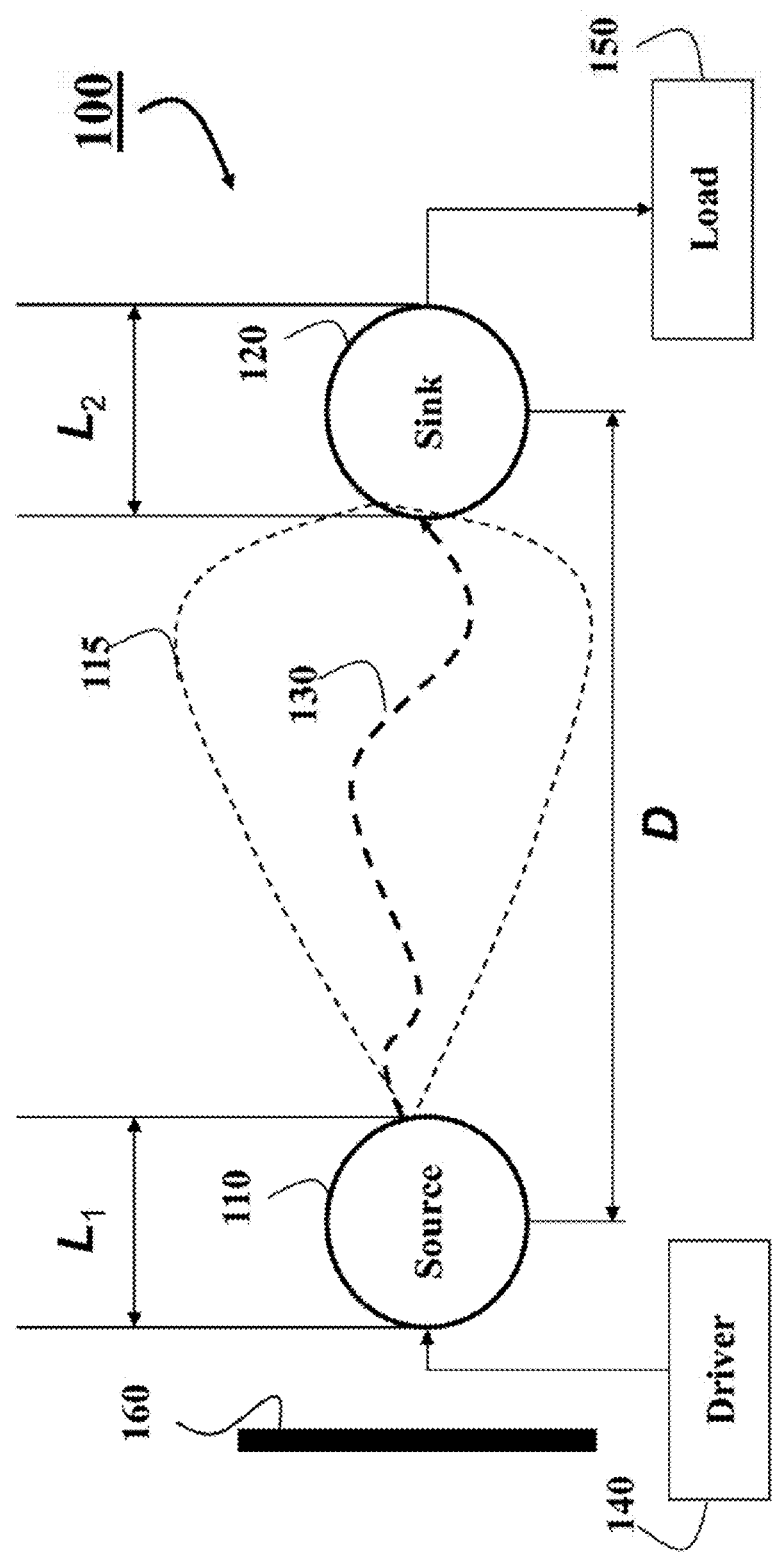
FIG. 1 is a schematic of a resonant coupling system for transferring energy wirelessly according to some embodiments of an invention.

FIG. 1 shows an example of a resonant coupling system 100 for transferring energy from a first resonator 110 to a second resonator 120 coupled to the first resonator to provide near-field wireless energy transfer between the first resonator and the second resonator. The first resonator and the second resonator are non-radiative structures having a resonant frequency, i.e., the resonator frequencies of the first and the second resonators are substantially identical.

The first resonator can be optionally coupled to an energy source, such as a driver 140 that inputs the energy into the first resonator to form an oscillating electromagnetic field 115. The first resonator having a size $L_1$ serves as a source of the energy for the wireless energy transfer. The second resonator having a size $L_2$ is connected to a power consuming device, e.g., a resistive load 150, and serves as a sink of the ireless energy transfer. The energy is transferred over a distance D between the resonators over a direction from the first resonator to the second resonator. The wireless non-radiative energy transfer is performed using the field 115, e.g., the electromagnetic field of the resonant system. For simplicity of this specification, the field 115 is an electromagnetic field. During the coupling of the resonant objects, evanescent waves 130 are propagated between the resonant source and the resonant sink.

The system 100 also includes an artificial magnetic conductor (AMC) 160 having the resonant frequency of the resonators and arranged within the system to shape the near-field 115 of at least one of the first resonator and the second resonator. In contrast with the AMC used for far-field applications, the resonant frequency of the AMC for wireless energy transfer should be low, e.g., frequencies ranging from 20 kHz to 1 MHz. Various embodiments of the invention design the AMC with such a resonant frequency, while keeping a size of the AMC small enough to be practical.

Various embodiments of the invention are based on a realization that different structures of the unit cells forming a layer in the AMC can be used in the periodic pattern of AMC, and thus those structures can be selected in consideration of desired resonant frequency. Accordingly, in various embodiments of the invention, the AMC includes a layer of unit cells arranged in a periodic pattern enabling the AMC to reflect the near-field, wherein each unit cell includes a plurality of electric components. For example, the unit cell can include a rectangular patch and a capacitor, or a rectangular patch and multiple capacitors or a capacitor and an inductor. In some embodiments, each unit cell includes at least one or combination of a multi-turn spiral and a plurality of capacitors.

Figure 2:
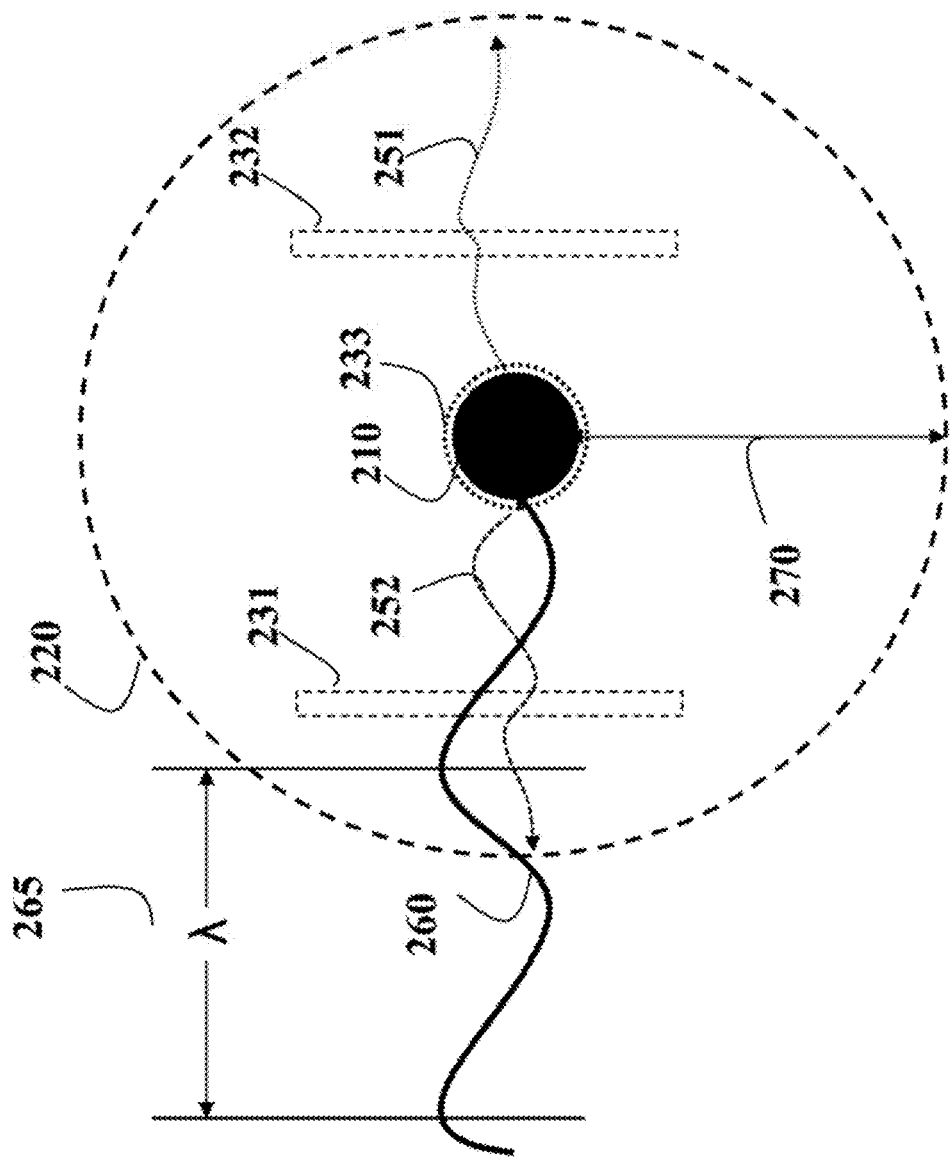
FIG. 2 is an example of arranging an artificial magnetic conductor (AMC) within the system of FIG. 1 according an embodiment of the invention.

FIG. 2 shows an example of arranging the AMC within the system including a first resonator 210 for coupling to a second resonator to provide near-field wireless energy transfer according an embodiment of the invention. The resonator 210 generates an electromagnetic near-field 220 when the energy is received by the resonator and transfers the energy wirelessly via a coupling of the near-fields and/or the evanescent waves.

The system includes one or a plurality of the AMC 231-233 shaping the near-field 220 to increase an efficiency of the energy transfer, i.e., increasing a coupling coefficient of coupling between the first and the second resonators. The AMC 231-233 arranged within the near-field 215-216 based on direction of energy transfer. For example, The AMCs 231 and 232 are arranged on a direction opposite to a direction of the energy transfer. For example, the AMC 231 is arranged for transferring energy into the direction 251, and the AMC 232 is for transferring the energy in the direction 252. In one embodiment, the AMC 233 substantially encloses the resonator 210.

FIG. 6A shows a perspective view of the AMC 630 arrange in proximity to the first resonator. FIG. 6B shows a side view of such an arrangement. In this embodiment, the first resonator includes a coil 610, and the second resonator includes a coil 620. A size the AMC is designed to substantially correspond to a size of the coils 610 and/or 620.

Figure 7A:
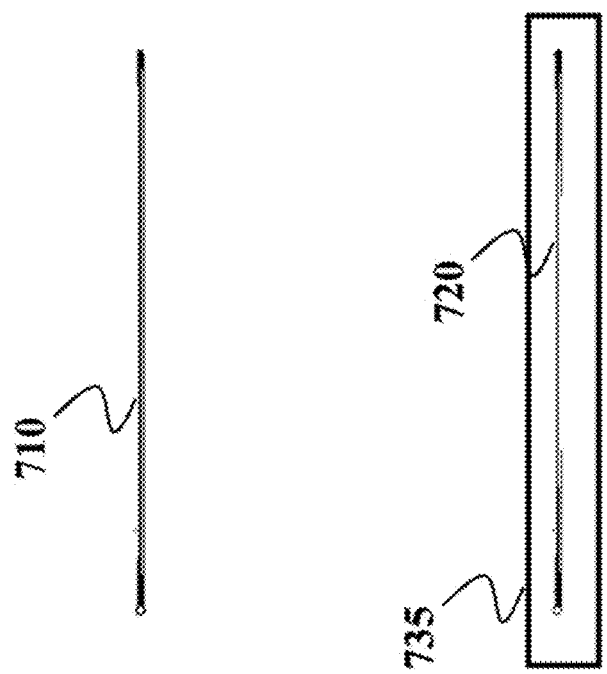
FIGS. 7A and 7B show different views of arranging the AMC according to different embodiments of the invention.
Figure 7B:
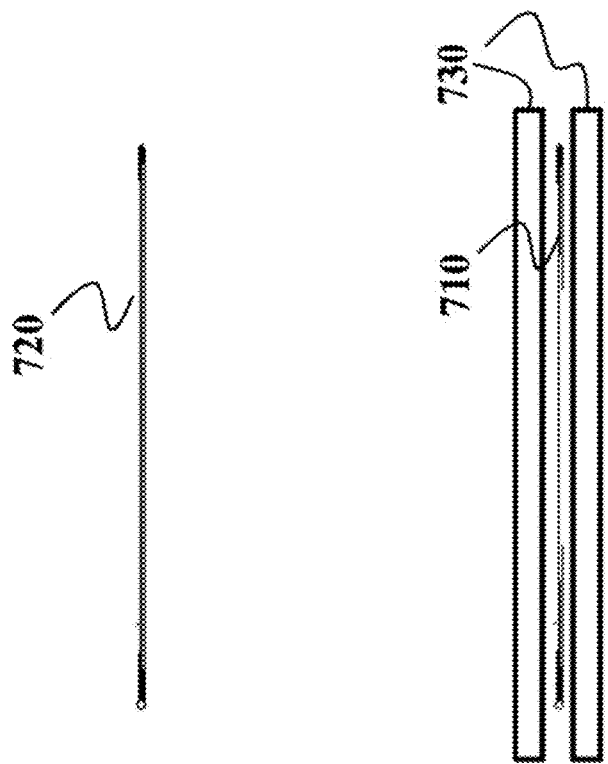

FIGS. 7A and 7B show side views of different arrangements of the AMC 730 and the AMC 735 around the first resonator 710 and/or the second resonator 720.

The AMC 630 arrange in proximity to the first resonator. FIG. 6B shows a side view of such an arrangement. In this embodiment, the first resonator includes a coil 610, and the second resonator includes a coil 620. A size the AMC is designed to substantially correspond to a size of the coils 610 and/or 620.

Referring back to FIG. 2, usually, a range 270 of the near-field is in an order of a dominant wavelength of the system. In non-resonant systems, the dominant wavelength is determined by a frequency of the external energy 260, i.e., the wavelength λ 265. In resonant systems, the dominant wavelength is determined by a resonant frequency of the EM structure. In general, the dominant wavelength is determined by the frequency of the wirelessly exchanged energy. Usually, the AMC is arranged within a distance less than ½ of a wavelength of the resonant frequency from the first resonator or the second resonator.

Some embodiments of the invention arranged the AMC in accordance with an energy distribution pattern of the near-field by the first and the second resonator during the energy transfer. Usually, the energy distribution pattern of the near-field has different zones with different intensities of the near field. For example, the energy distribution pattern can include a first zone, e.g., an optimal zone, and a second zone, e.g., a blind zone, wherein the intensities of the optimal zones are greater than intensities in the blind zone. The location and/or orientation of the zones can vary based on a type of the energy distribution pattern. Some embodiments of the invention arranged the AMC within the optimal zones to shape the near-field.

Figure 3:
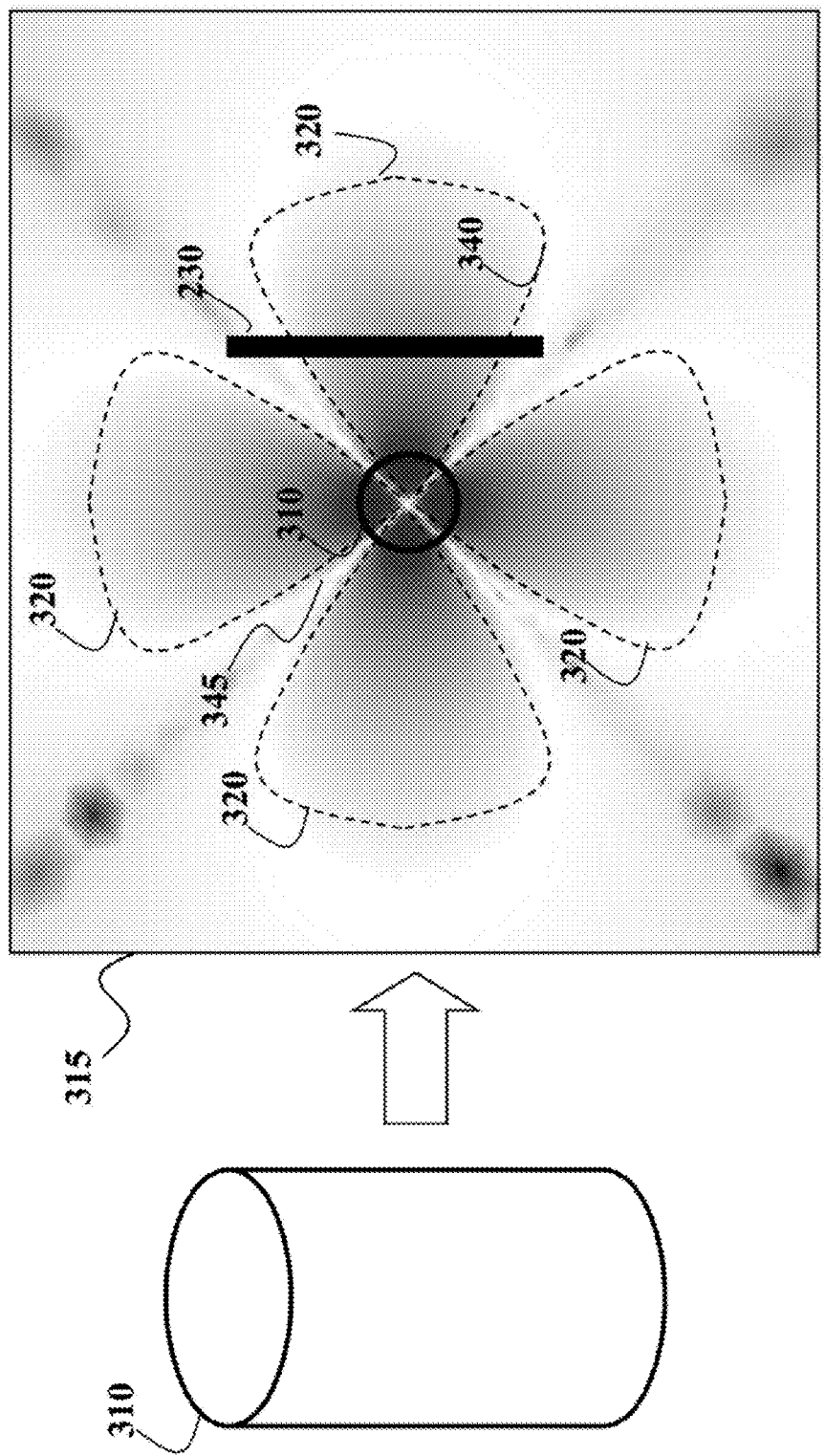
FIG. 3 is an example of the resonator generating the near-field according to an energy distribution pattern.

FIG. 3 shows an example of the resonator, i.e., a disk 310. Depending on material, geometry and dimensions of the disk 310, as well as the dominant frequency, the EM near-field intensities and energy density are maximized at the surface of the disk according to a pattern 315. The pattern 315 includes zones 345, in which the intensity of the EM near-field is reduced, and optimal zones 340, in which the intensity of the EM near-field is increased. Some embodiments of the invention place the AMC 230 in the optimal zones 340.

Figure 4:
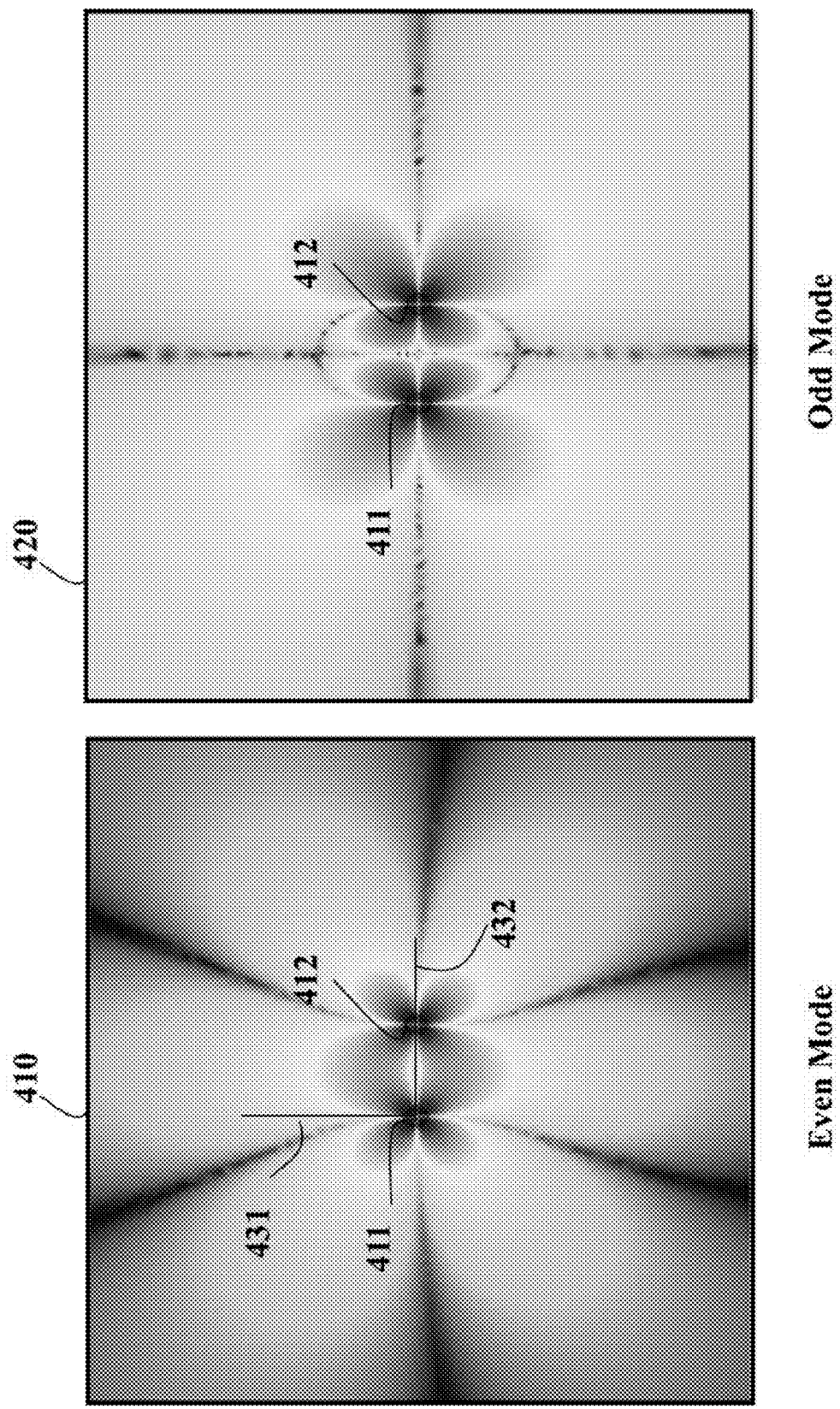
FIG. 4 is an example of a butterfly energy distribution pattern.

FIG. 4 shows a butterfly energy distribution pattern. When two resonators 411 and 412 are coupled to each other forming a coupled system, the dominant frequency of the coupled system is represented by even and odd frequencies. The near-field distribution at even and odd frequencies is defined as even mode coupled system 410 and an odd mode coupled system 420. Typical characteristic of the even and the odd modes of the coupled system of two EM structures is that if the EM field is in phase in the even mode then the EM field is out of phase in the odd mode.

The even and odd mode coupled systems generate an odd and even mode distribution patterns of the near-field intensities defined as a butterfly pair. The EM near-field intensity distribution of the butterfly pair reaches minimum in two lines 431 and 432 oriented at 0 degree and 90 degree to the center of each EM structure, i.e., blind zones of the butterfly pair. However, it is often desired to change the intensity distribution and eliminate and/or change the positions and/or orientations of the blind zones.

FIG. 5 shows distribution patterns of the near-field intensities according embodiments of the invention define as a crossing pair 500. The crossing pair distribution pattern has optimal zones 531 and 532 oriented at 0 degree and 90 degree to the center of each EM structure, i.e., the optimal zones of the crossing pair pattern corresponds to the blind zones of the butterfly pair pattern. Therefore, one important characteristic of the butterfly pair and the crossing pair patterns is that their respective blind zones are not overlapping, and thus allows for eliminating the blind zones when both kinds of patterns are utilized. Butterfly and crossing patterns have the system quality factor and the coupling coefficient of the same order of magnitude.

Some embodiments of the invention determines a type of the energy distribution pattern formed by the first and the second resonator and arranged the use the AMC within the first, i.e., the optimal zone of the energy distribution pattern. In some embodiment the locations of the resonators and/or the energy distribution pattern are predetermined, and the AMC are arranged to optimize the coupling. In some embodiments, different types of the energy distribution pattern for different locations of the resonators and the AMC are tested to achieve this objective experimentally.

Figure 8:
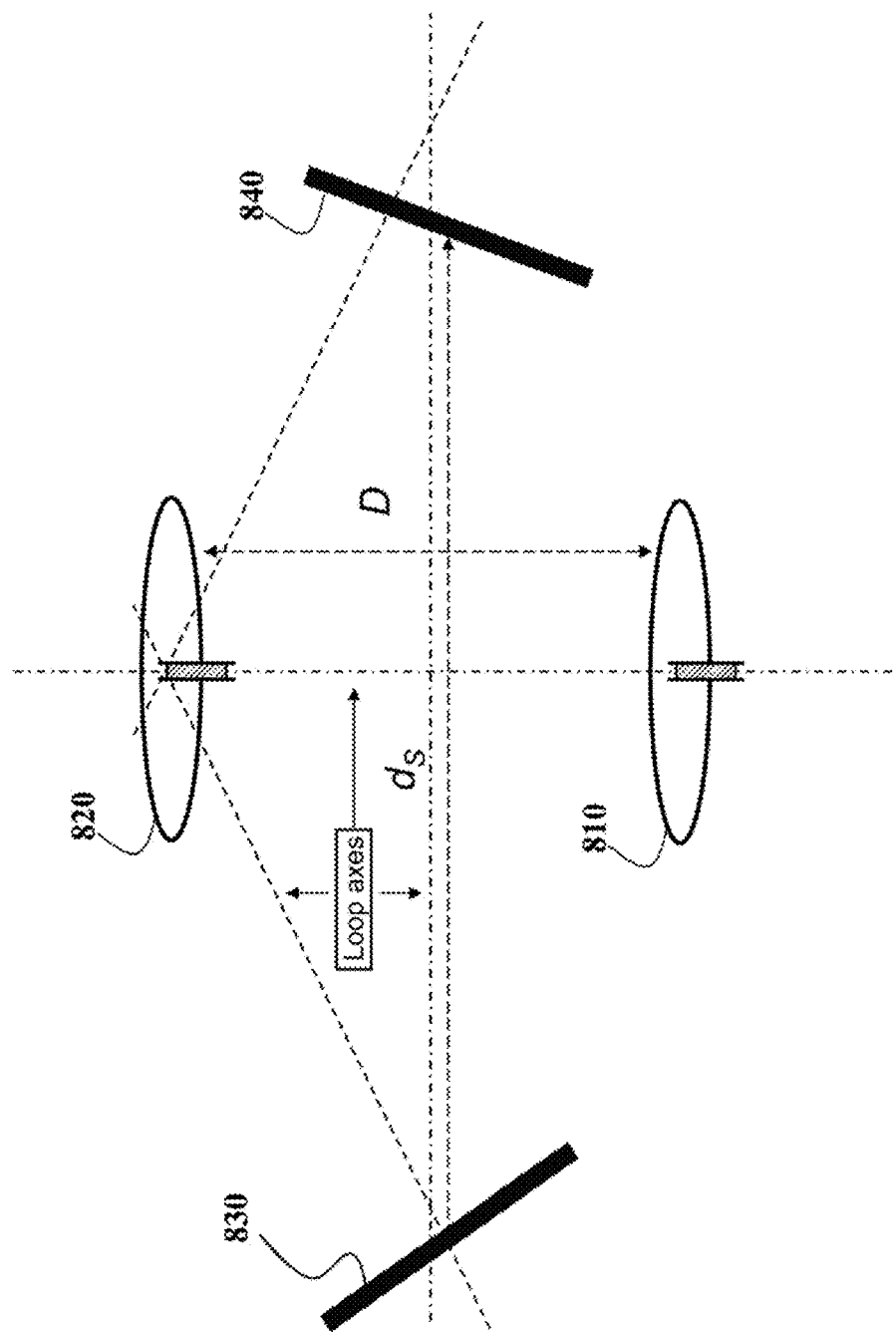
FIG. 8 is an example of a system configured to optimized transmission of the energy according to one embodiment.

FIG. 8 shows an example of a system configured to optimized transmission of the energy from the source resonator 810 to the sink resonator 820 using a first AMC 830 and/or a second AMC 840. In this embodiment, the AMC are arranged to reflect the near-field formed by the resonators toward the sink resonator. The AMC are arranged based on the type of the energy distribution pattern of the near-field.

The source 810 and the sink 820 are arranged over a distance D from each other measured from their respective centers. The source and the sink are aligned such that axes of the source and the sink lie along the same line. The source is connected to the driver (not shown) and the sink is connected to the load (not shown). The first and the second AMCs are separated by a distance $d_s$ and are arranged such as to increase the coupling of evanescent waves between the source and the sink resonators. The distance $d_s$ is selected such that the first AMC and the second AMC are weakly coupled to each other. In one embodiment, the AMCs are rotated such that their axes points towards the sink. In another embodiment the axes of the AMCs are perpendicular to the axis of the source and sink.

Figure 9:
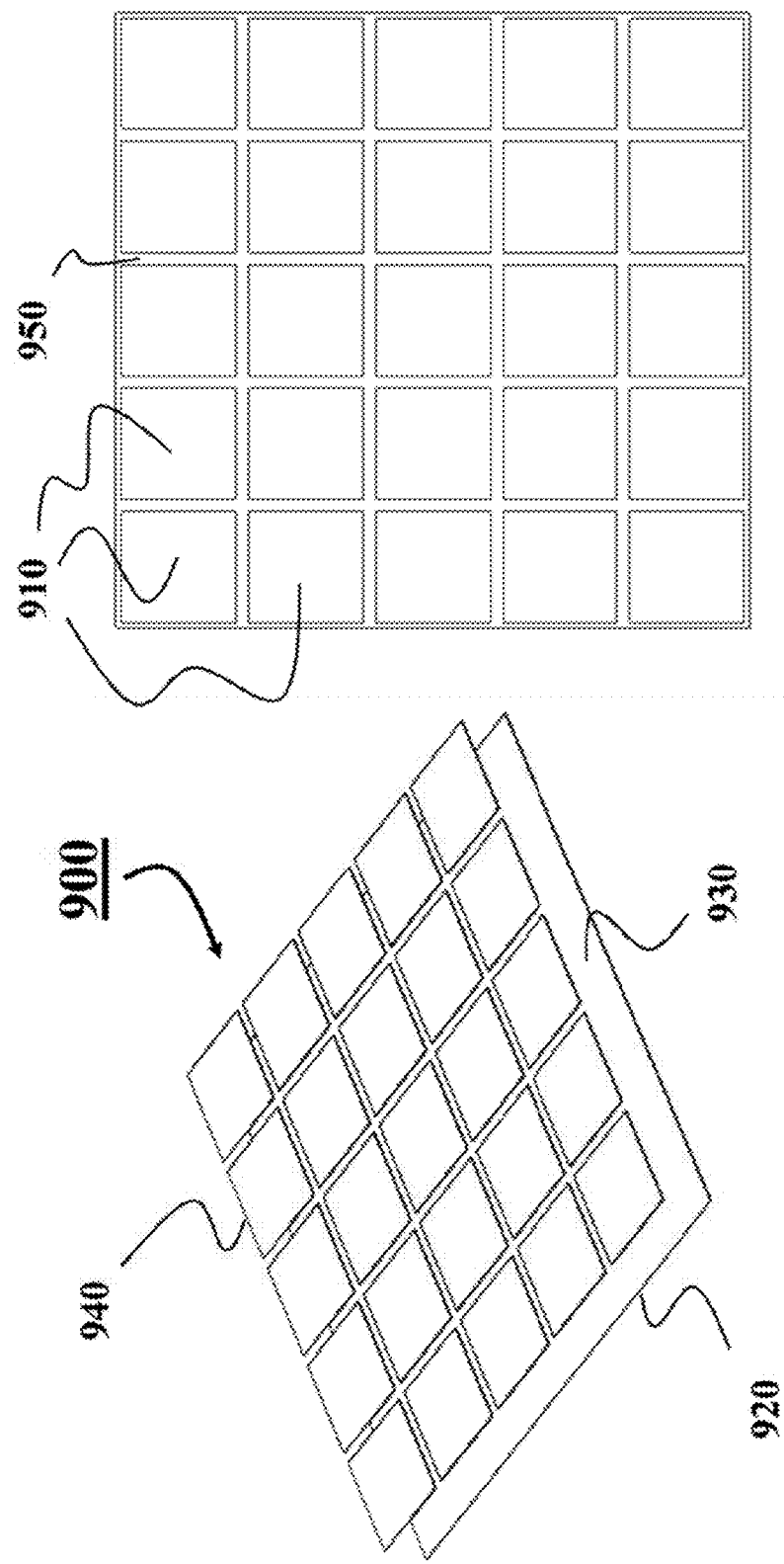
FIG. 9A is a perspective view and FIG. 9B is a top view of the AMC for wireless energy transfer via coupling between a first resonator and a second resonator having a resonant frequency according to some embodiments of the invention.

FIG. 9A shows a perspective view of the AMC 900 for wireless energy transfer via coupling between a first resonator and a second resonator having a resonant frequency according to some embodiments of the invention. The AMC 900 includes a conductive ground plane 920, a substrate 930 disposed at the ground plane 920, and a layer 940 of unit cells arranged on the substrate in a periodic pattern enabling the AMC to reflect the near-field for the energy transfer.

FIG. 9B shows a top view of the AMC 900 depicting a periodic pattern of unit cells 910. In this example, the periodic pattern includes a gap 950 between neighboring unit cells 910. In the example of FIG. 9B, the unit cell includes at least one metallic patch.

In various embodiments, the unit cells and/or an inductance and a capacitance of each component of each unit cell of the AMC are selected to produce the AMC with the resonant frequency of the resonators transferring the energy. In some embodiments, the resonant frequency is within a range from 20 kHz to 1 MHz. In one embodiment, the resonant frequency of the AMC is about 100 kHz+−10%.

Various embodiments of the invention are based on a realization that each unit cell does not have to include the rectangular patch, or at least only a rectangular patch to form the AMC. Different structures of the unit cells can be used in the periodic pattern of AMC, and thus those structures can be selected in consideration of desired resonant frequency. Accordingly, in various embodiments of the invention, the AMC includes a layer of unit cells arranged in a periodic pattern enabling the AMC to reflect the near-field, wherein each unit cell includes a plurality of electronic components. The inductance and capacitance of those electronic components are selected for make the AMC of relatively low resonant frequency suitable for wireless energy transfer.

For example, the unit cell can include a rectangular patch and a capacitor, or a rectangular patch and multiple capacitors or a capacitor and an inductor. In some embodiments, each unit cell includes at least one or combination of a multi-turn spiral and a plurality of capacitors.

Figure 10:
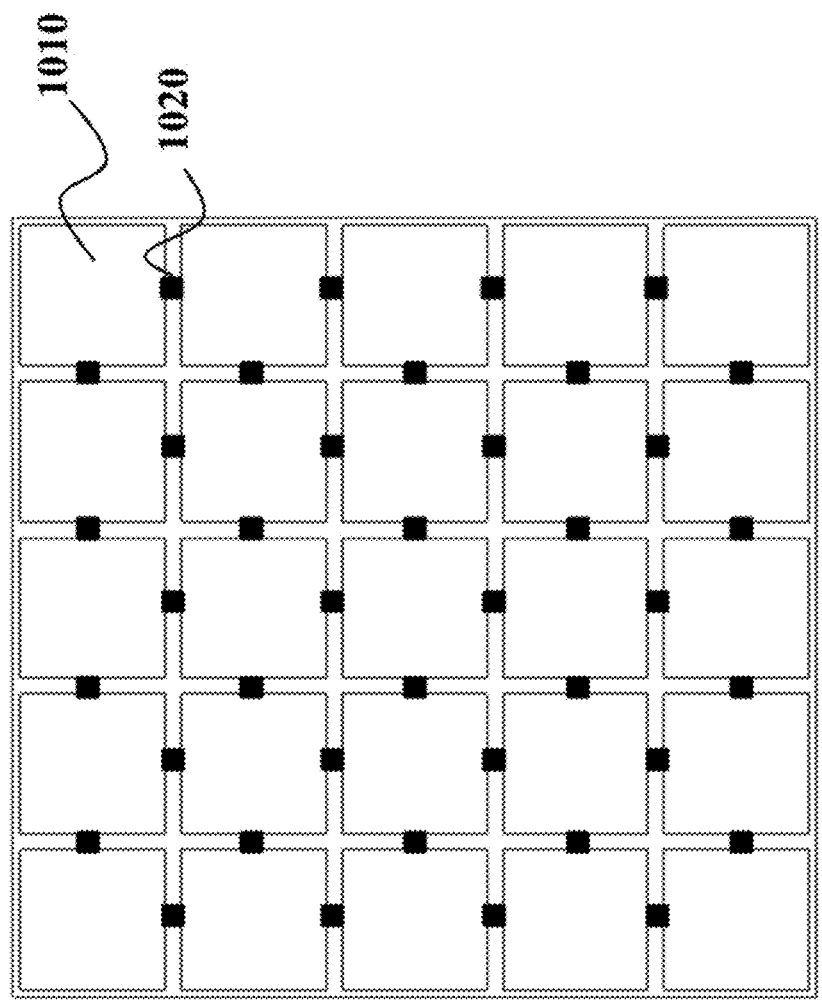
FIG. 10 is an example of the AMC according to one embodiment of the invention.

FIG. 10 shows an example of the AMC according to one embodiment of the invention. In this embodiment, a unit cell 910 includes a metallic patch 1010 and at least one capacitor 1020 connected to the patch. The unit cells are oriented such that the at least one capacitor of the unit cell is mounted in the gap between the neighboring patches. In some embodiments, the additional capacitors are used to complete the periodic pattern. By changing the value of these capacitors, the resonant frequency of the AMC can be effectively tuned.

Figure 11:
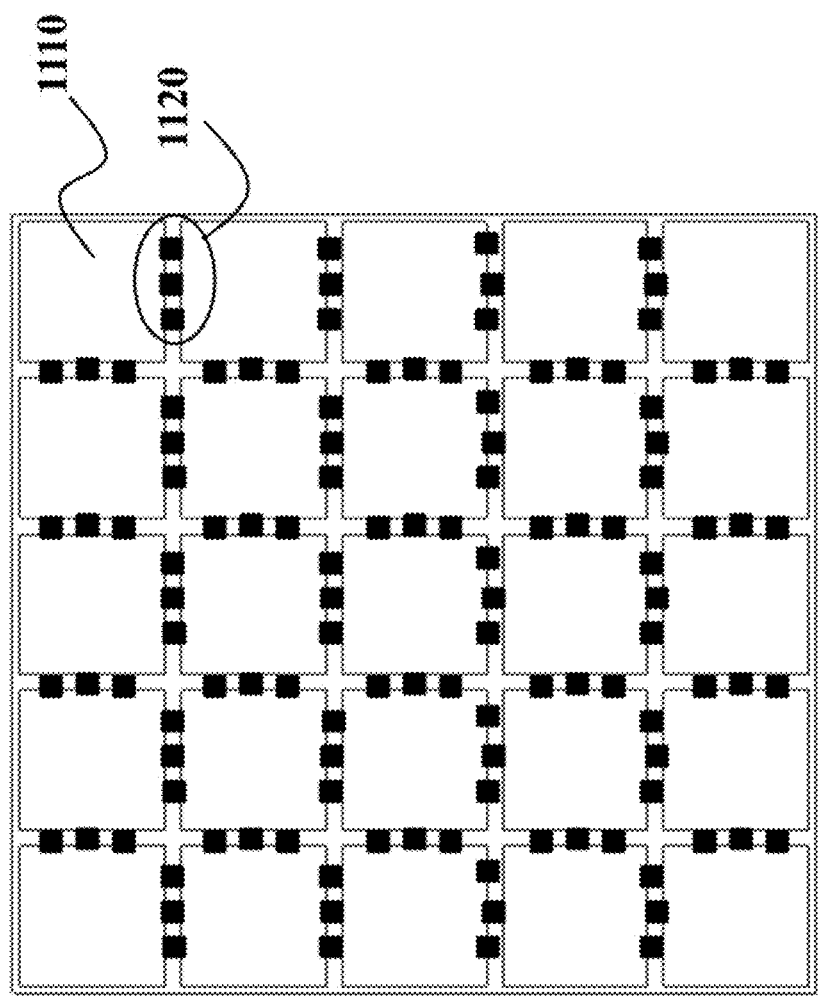
FIG. 11 is an example of the AMC with multiple capacitors according to another embodiment of the invention.

FIG. 11 shows the AMC according to another embodiment of the invention. In this embodiment, a unit cell 910 includes a metallic patch 1110 and a plurality 1120 of capacitors arranged in the gap between the neighboring patches. In the embodiment of FIG. 11, the unit cells include three capacitors. Similarly with the embodiment of FIG. 10, the unit cells are oriented to arrange those three capacitors in the gap between the neighboring unit cells.

This embodiment is based on recognition that when only one capacitor is used, the surface current and amplitude of electric field at resonance is strong in the vicinity of these capacitors, which can cause concentration and distortion of the magnetic field, heating and energy loss during the wireless energy transfer. The embodiment of FIG. 11 addresses this problem, because multiple capacitors can reduce the concentration of the surface current and dissipate the heat more efficiently.

Figure 12:
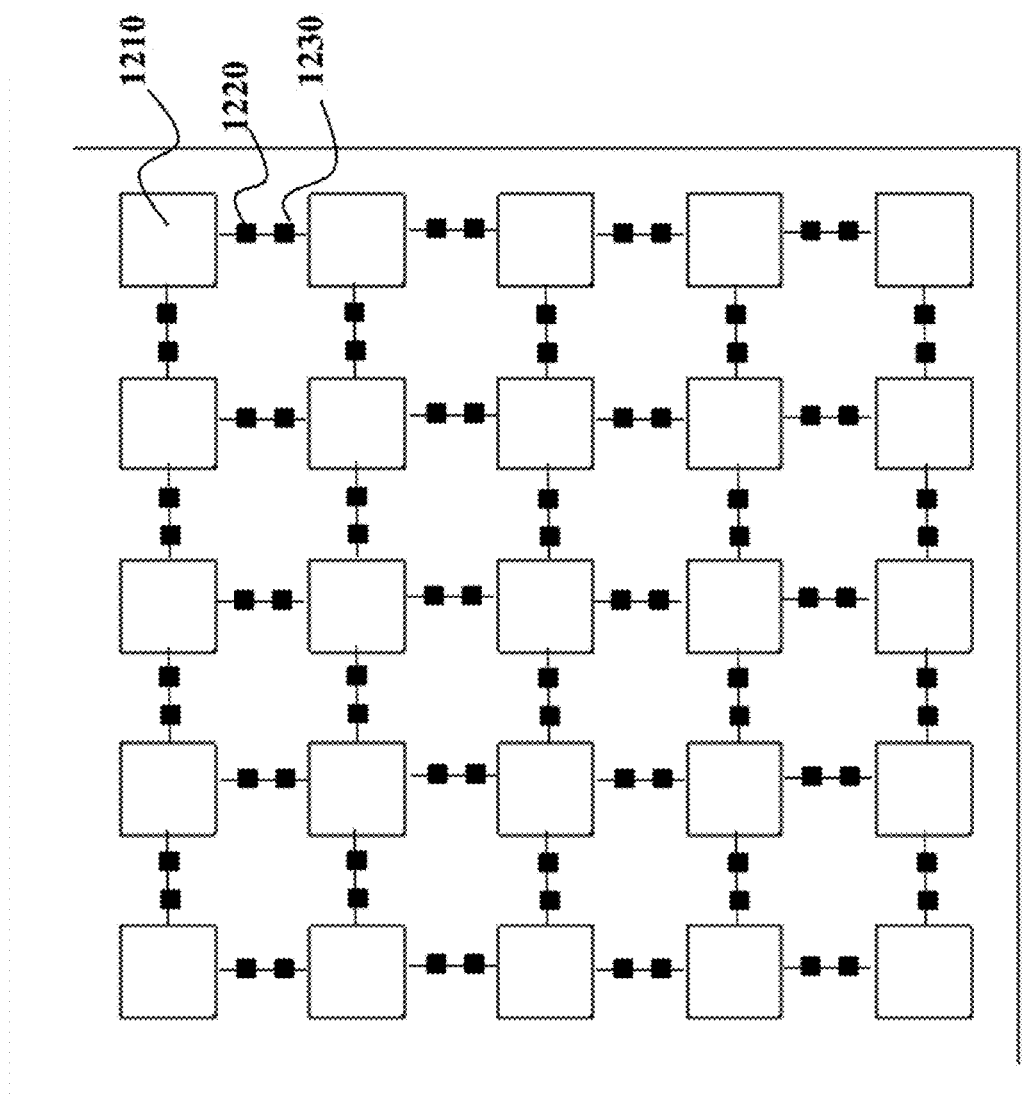
FIG. 12 is an example of the AMC according to another embodiment of the invention with at least one capacitor and at least one inductor.

FIG. 12 shows the AMC according to another embodiment of the invention, wherein the unit cell includes a patch 1210, at least one capacitor 1220 and at least one inductor 1230 arranged in the gap between the neighboring patches. Such arrangement increases both effective inductance and capacitance of the structure and help to tune the resonant frequency to the desired value.

Some embodiments of the invention replace the patches components of the unit cells with different structures with increased effective inductance. For example, some embodiment used multi-turn spirals. Such spirals can be designed to have effective inductance much larger than a metallic patch of the same size and also can decrease the concentration of surface current.

Figure 13:
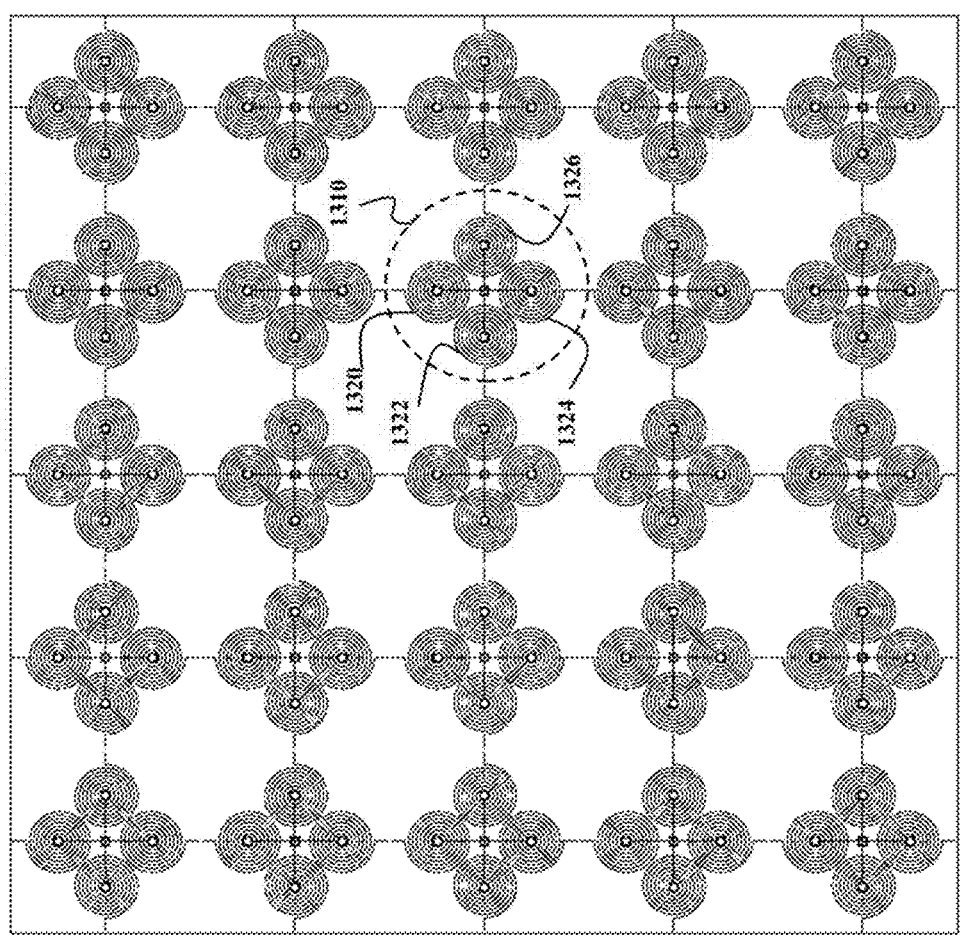
FIG. 13 is an example of a periodic patter of unit cells including spirals according to one embodiment of the invention.

FIG. 13 shows an example of a periodic patter of unit cells 1310 forming the layer of the AMC according to one embodiment of the invention. In this embodiment, each unit cell includes a plurality of multi-turn spirals, such as spirals 1320, 1322, 1324, and 1326. In some variations of this embodiment, the multi-turn spirals of each unit cell are electrically connected by vias.

Figure 14A:
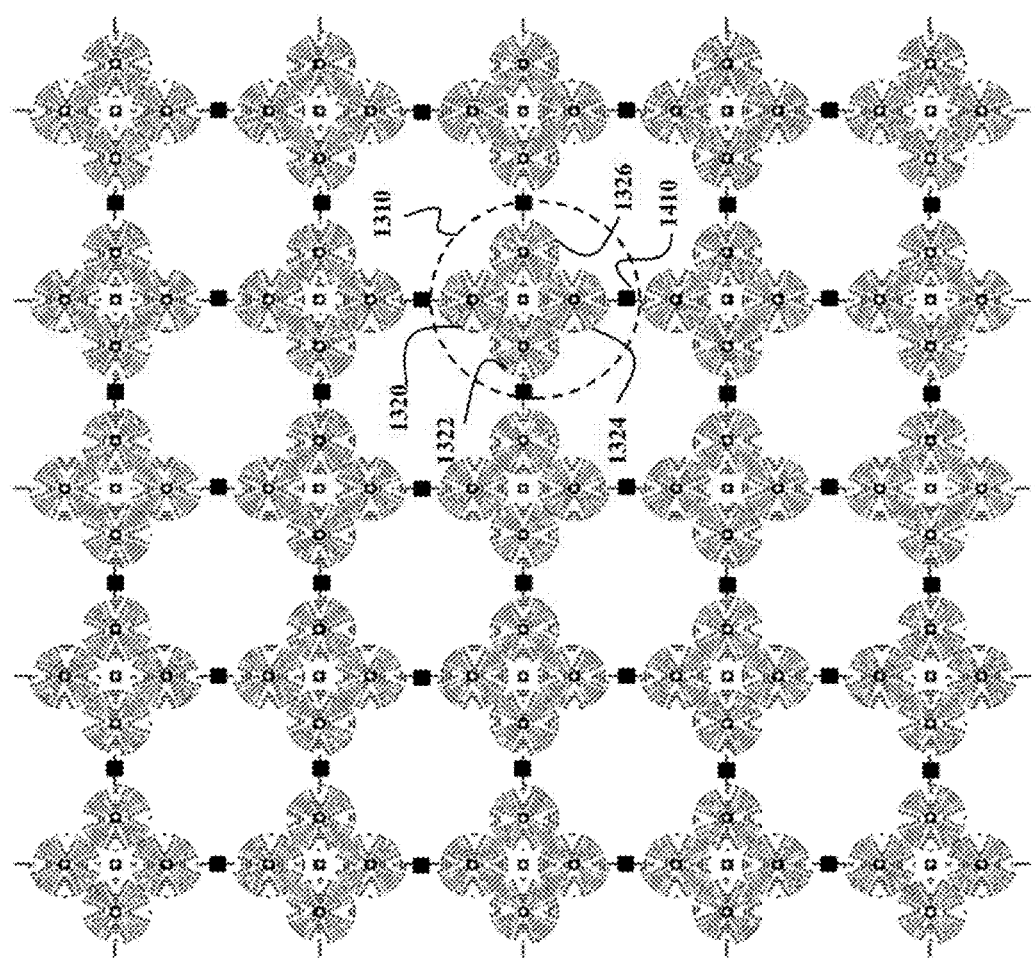
FIG. 14A shows a top view and FIG. 14B shows a bottom view of the AMC layer of another embodiment, in which the multi-turn spirals are electrically connected through one or combination of vias and capacitors.
Figure 14B:
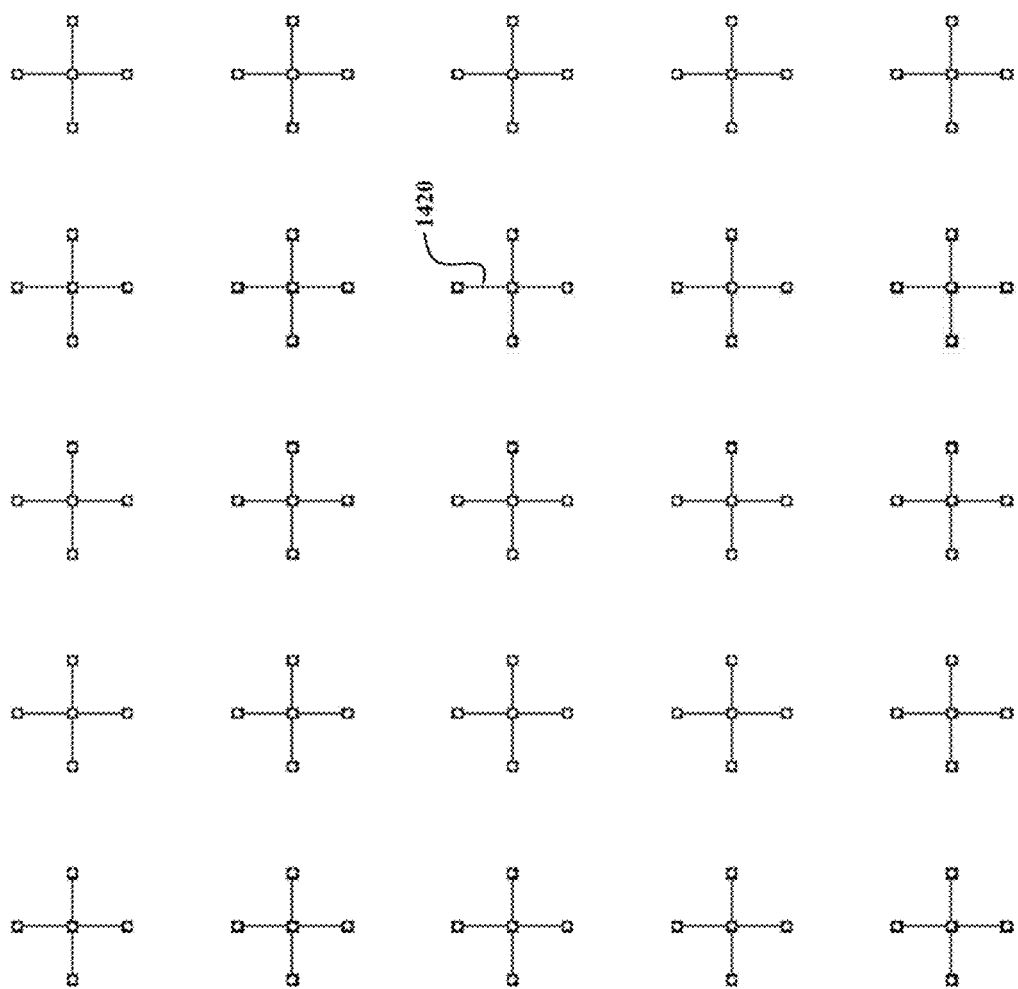

FIG. 14A shows a top view and FIG. 14B shows a bottom view of the AMC layer of another embodiment, in which the multi-turn spirals of neighboring unit cells are electrically connected through one or combination of vias 1420 and capacitors 1410.

Figure 15:
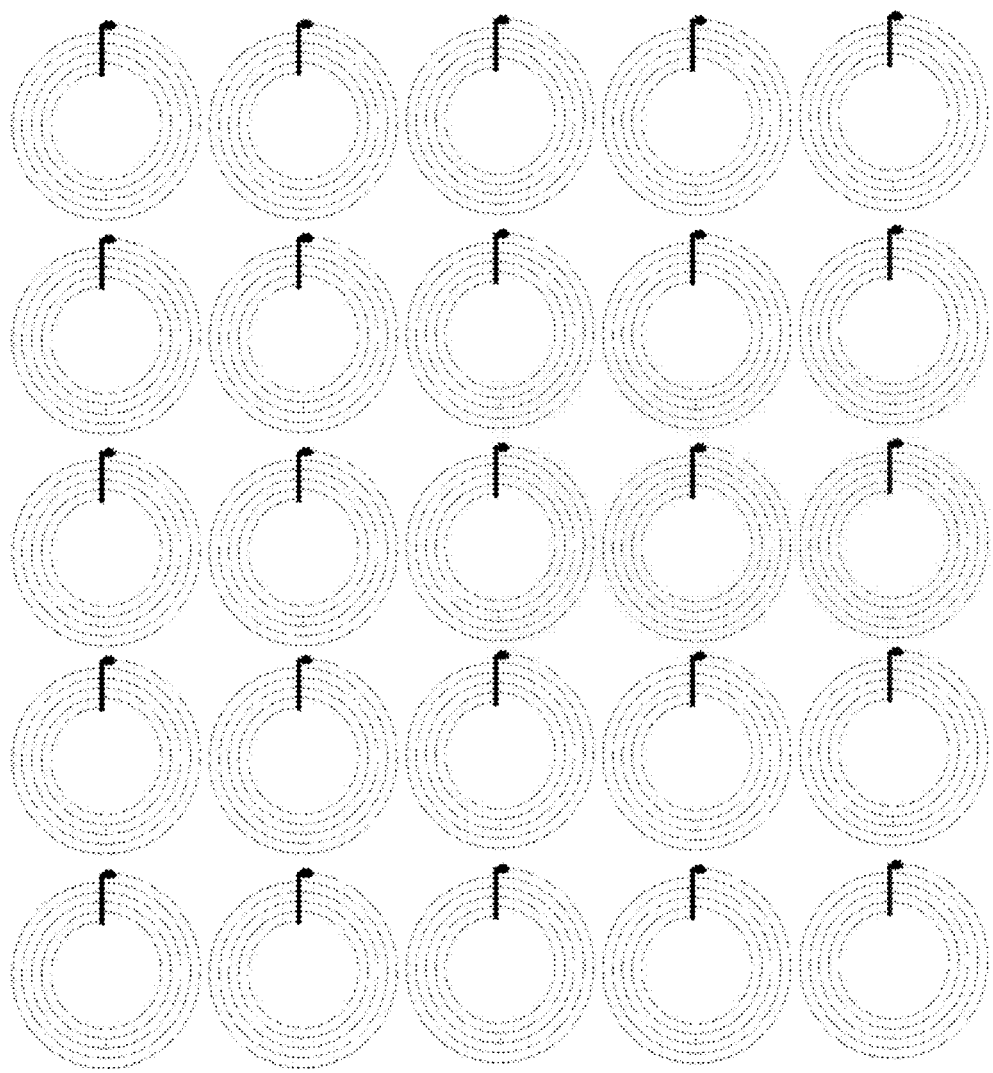
FIG. 15 is a top view of the AMC according another embodiment, in which each unit cell includes a multi-turn spiral and a capacitor.

FIG. 15 shows a top view of the AMC according another embodiment, in which each unit cell includes a multi-turn spiral 1510 and a capacitor 1520. In one variation of this embodiment, the neighboring unit cells are not connected.

In some embodiments, the layer of unit cells includes at least two unit cells with different resonant frequencies. Such approach can be beneficial to better control and manipulate the magnetic field distribution of the system. The different and/or tunable resonant frequencies of different unit cells can be achieved in different ways. For example, in some embodiments, at least some metallic components have different design and have a different effective inductance and/or capacitance. Some embodiments use different capacitors at different positions so that the resonant frequency is different at those positions. Tunable elements can also be used in the structures instead of fixed value capacitors and inductors.

Figure 16:
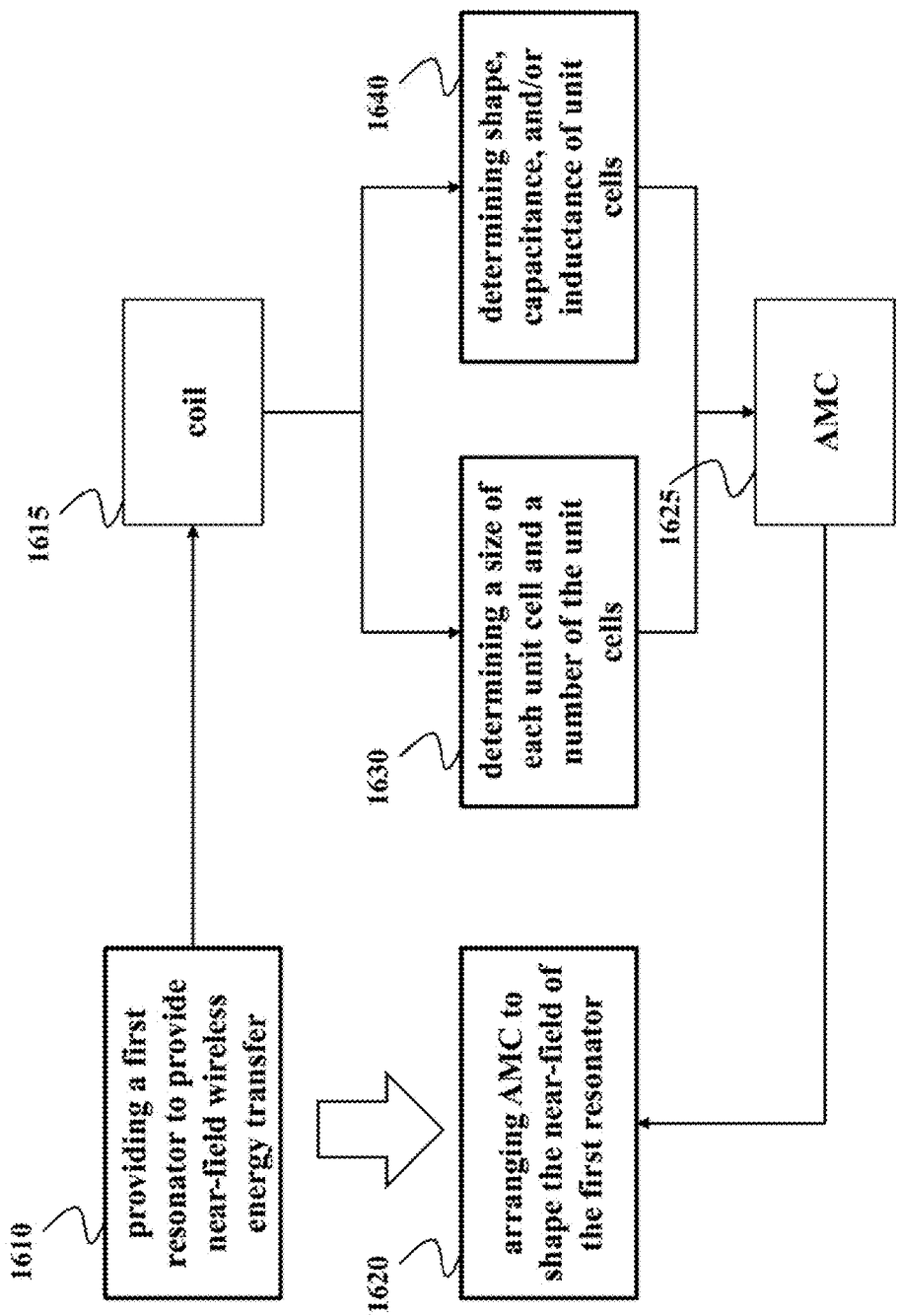
FIG. 16 is a block diagram of a method for wireless transfer of energy according to some embodiments of the invention.

FIG. 16 shows a block diagram of a method for wireless transfer of energy according to some embodiments of the invention. The method includes providing 1610 a first resonator for coupling to a second resonator to provide near-field wireless energy transfer between the first resonator and the second resonator, and arranging 1620 the AMC 1625 having the resonant frequency of the first and the second resonators. In some embodiments, the AMC is arranged within a distance less than ½ of a wavelength of the resonant frequency from the first resonator on a direction opposite to a direction of the energy transfer to shape the near-field of the first resonator.

In some embodiments, the first resonator includes a coil 1615 for transferring the energy, and the AMC is designed based on a size of the coil. For example, one embodiment determines a size of each unit cell and a number of the unit cells, such that the layer of the AMC has a size corresponding to a size of the coil. The embodiment also determines one or combination of a shape, a capacitance and an inductance of each electronic component in each unit cells, such that the resonant frequency of the AMC matches the resonant frequency of the first resonator.

In some embodiments of the invention, the unit cells are connected to a conductive ground plane by low-inductance shunting via. For example, the shunting via can be a straight wire of relatively low self-inductance or a through-connection containing a series inductor. The inductance, such as a self-inductance of a straight wire or the inductance of the additional coiled inductor can change the resonant frequency of the AMC without changing the size of the unit cell.

The resonant frequency f of an AMC is determined by the equivalent inductance L and capacitance C of its unit cell. $f=1/(2\pi\sqrt{LC})$. On the other hand, the quality factor of the AMC surface also depends on the equivalent resistance R, inductance and capacitance. $Q=\sqrt{L/C}/R$. Higher quality factor leads to lower power loss. The object of some embodiments is to design the AMC with correct resonant frequency, but also high quality factor. When a lower resonant frequency is required, some embodiments increase inductance, or capacitance, or both, while keeping the resistance of the AMC low. For a given unit cell size, spiral structures can have much larger inductance compared with metallic patches in conventional AMC. From the quality factor equation, it is desirable to have larger inductance instead of larger capacitance.

The equivalent resistance, inductance, and capacitance all depends on the geometries and materials of the unit cell structure. For example, the equivalent inductance of planar spiral structures can be determined with analytical models described in US 2013/0144,588. The capacitance between metallic wires or ground plane can also be calculated. The resistance of metallic wires can also be determined. The resonant frequency then can be predicted. When lower operating frequency is desired, additional inductors and capacitors can be added to each unit cell to change the overall inductance and capacitance.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system, comprising:
   a first resonator coupled to an energy source;
   a second resonator located a distance from the first resonator and coupled to the first resonator to provide near-field wireless energy transfer between the first resonator and the second resonator, wherein the first resonator and the second resonator are non-radiative structures having a resonant frequency; and
   an artificial magnetic conductor (AMC) having the resonant frequency and arranged within the system to shape the near-field of at least one of the first resonator and the second resonator, wherein the AMC includes a layer of unit cells to arranged in a periodic pattern enabling the AMC to reflect the near-field, wherein each unit cell includes a plurality of electronic components.

2. The system of claim 1, wherein the AMC is arranged within a distance less than ½ of a wavelength of the resonant frequency from the first resonator or the second resonator on a direction opposite to a direction of the energy transfer to increase a coupling coefficient of the energy transfer.

3. The system of claim 1, wherein the resonant frequency is within a range from 20 kHz to 1 MHz, and an inductance and a capacitance of each component of each unit cell are selected to produce the AMC with the resonant frequency.

4. The system of claim 1, wherein an effective inductance and capacitance of each unit cell is selected for the resonant frequency of the AMC about 100 kHz±10%.

5. The system of claim 1, wherein the layer of unit cells includes at least two unit cells with different resonant frequencies.

6. The system of claim 1, wherein a unit cell includes a metallic patch and at least one capacitor connected to the patch, wherein the periodic pattern includes a periodic pattern of patches with a gap between neighboring patches, and wherein the unit cells are oriented such that the at least one capacitor of the unit cell is mounted in the gap between the neighboring patches.

7. The system of claim 6, wherein the unit cell includes a plurality of capacitors arranged in the gap between connect the neighboring patches.

8. The system of claim 6, wherein the unit cell includes at least one capacitor and at least one inductor arranged in the gap between the neighboring patches.

9. The system of claim 1, wherein each unit cell includes a plurality of multi-turn spirals.

10. The system of claim 9, wherein the plurality of multi-turn spirals of each unit cell are connected by vias.

11. The system of claim 9, wherein multi-turn spirals of neighboring unit cells are connected by one or a combination of vias and capacitors.

12. The system of claim 1, wherein each unit cell includes a multi-turn spiral and a capacitor.

13. The system of claim 1, wherein the first resonator includes a coil, and wherein a size and a number of the unit cells are selected such that a size of the layer of unit cells of the AMC substantially corresponds to a size of the coil.

14. A method for wireless transfer of energy, comprising:
   providing a first resonator for coupling to a second resonator to provide near-field wireless energy transfer between the first resonator and the second resonator, wherein the first resonator and the second resonator are non-radiative structures having a resonant frequency within a range from 20 kHz to 1 MHz; and
   arranging an artificial magnetic conductor (AMC) having the resonant frequency within a distance less than ½ of a wavelength of the resonant frequency from the first resonator on a direction opposite to a direction of the energy transfer to shape the near-field of the first resonator, wherein the AMC includes a layer of unit cells arranged in a periodic pattern enabling the AMC to reflect the near-field, wherein each unit cell includes a plurality of electronic components.

15. The method of claim 14, wherein the first resonator includes a coil for transferring the energy, further comprising:
   determining a size of each unit cell and a number of the unit cells, such that the layer of the AMC has a size corresponding to a size of the coil; and
   determining one or combination of a shape, a capacitance and an inductance of each electronic component in each unit cells, such that the resonant frequency of the AMC matches the resonant frequency of the first resonator.

16. The method of claim 14, wherein each unit cell includes at least one or combination of a multi-turn spiral and a plurality of capacitors.

\* \* \* \* \*